Jan. 2, 1968 K. REICHEL ETAL 3,361,347
THERMOSTATICALLY CONTROLLED GAS VALVE
Filed Dec. 21, 1965
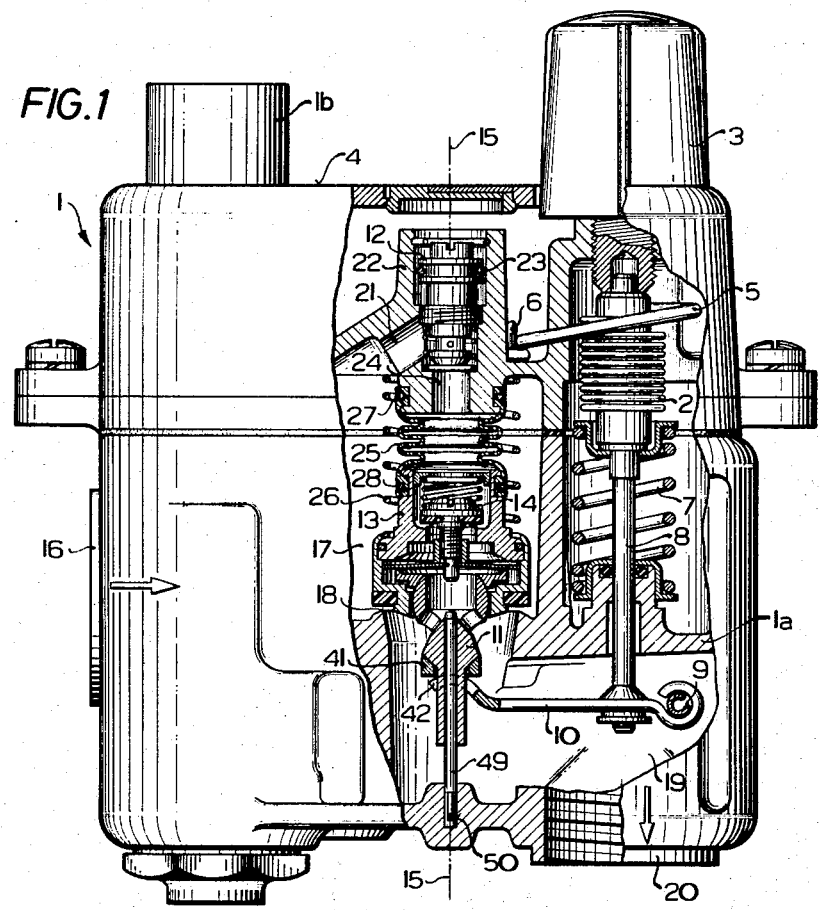
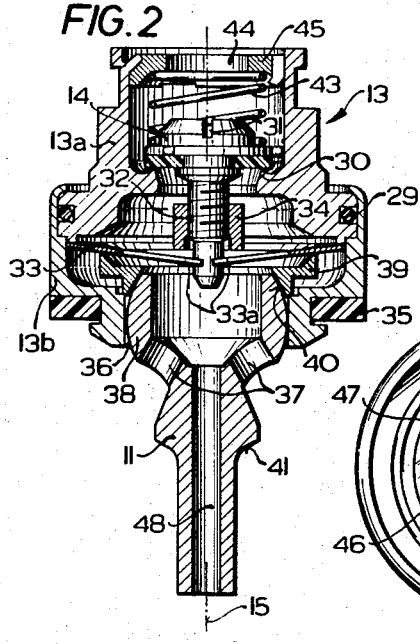
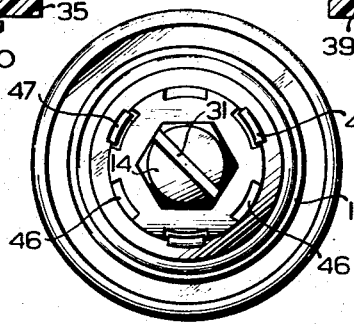
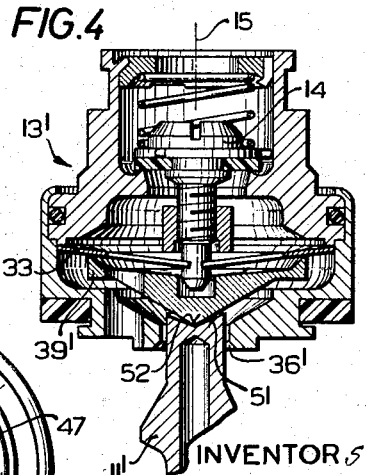
INVENTORS
Kurt Reichel and
Siegfried Vollrecht
Michael S. Strike
Attorney

United States Patent Office 3,361,347
Patented Jan. 2, 1968

3,361,347
THERMOSTATICALLY CONTROLLED
GAS VALVE
Kurt Reichel and Siegfried Vollprecht, Wernau (Neckar), Germany, assignors to Junkers and Co. G.m.b.H., Wernau (Neckar), Germany
Filed Dec. 21, 1965, Ser. No. 515,380
Claims priority, application Germany, Dec. 23, 1965, J 27,210
14 Claims. (Cl. 236—48)

ABSTRACT OF THE DISCLOSURE

A thermostatically controlled gas valve having a main valve body for controlling flow of a major gas stream through the valve and an auxiliary valve which controls gas flow through a throttle passage and which is operatively connected to the expansion body of a thermostat to be operated thereby, wherein the throttle passage, the main valve and the auxiliary valve are arranged along a common axis laterally of the expansion body of the thermostat.

---

The present invention relates to a thermostatically controlled gas valve having a main valve body for controlling flow of a major gas stream through the valve and an auxiliary valve which controls gas flow through a throttled passage and which is operatively connected to the expansion body of a thermostat to be operated thereby.

Gas valves of such a construction permit adjustment of a small auxiliary gas stream and continuous regulation of a main gas stream passing for instance to a burner of a gas heated arrangement. Thermostatically controlled valves of such a construction are known in the art in which movement of the expansion body of a thermostat is transmitted through a lever onto a pusher member or control rod which acts through a pressure plate onto a snap spring which during snap-over acts first on the auxiliary valve to open the throttled passage. The arrangement is made in such a manner that during further contraction of the expansion body of the thermostat the main valve body will be opened more or less by means of the lever, the control rod and the pressure plate according to the heat requirement indicated by the thermostat. The valve seat of the auxiliary valve is formed by the main valve body. Movement of the main valve body and the auxiliary valve is produced as usual against the force of return springs. The auxiliary gas stream is adjusted by means of a throttling screw arranged in the throttled passage.

Known gas valves of the aforementioned kind have, however, the disadvantage that they require relatively large space, that the valve housing necessarily includes complicated passages and that an adjustment of the various valve members is extremely complicated. The known valves have the additional disadvantage that the various valve members are not properly guided during their movement so that jamming or irregular movement of the movable valve members may occur. In addition, the adjustment and exchange of the individual valve parts is extremely difficult in the known valve arrangements and only possible by a complete disassembly of the valve housing.

It is an object of the present invention to overcome the disadvantages of valves of this kind known in the art.

It is an additional object of the present invention to provide for a valve of the aforementioned kind which is not only very compact in its arrangement, but which permits also adjustment and exchange of various valve members in an extremely simple manner.

It is a further object of the present invention to provide for a valve arrangement of the aforementioned kind in which the movable members thereof are properly guided so that valve will function prefectly even after extended use.

With these objects in view, the thermostatically controlled valve comprises a housing in which the throttle for throttling the passage means through which the auxiliary gas flow passes, the main valve body which cooperates with a valve seat for controlling the main gas flow through the valve and the auxiliary valve which controls flow of gas through the throttled passage are arranged along a common axis and preferably laterally of the expansion body of the thermostat which may be arranged likewise in the valve housing. Due to the arrangement of the aforementioned valve members along a common axis, it is possible to house these members in a relatively small space and they may for instance be accommodated in a common housing between the adjustable thermostat and additional control arrangements in the same housing which may be operated by pushbuttons, for instance a thermo-electric operated safety valve preventing flow of gas to the heater when the gas furnished to the heater is not ignited. The coaxial arrangement of the aforementioned valve members permits also an exact adjustment of these members during assembly of the arrangement and permits also a simplified and exact machining of the valve housing and the parts coaxially arranged therein.

The passage means through which the throttled gas flow passes includes according to the present invention a rigid part arranged along said common axis and into which a throttling member is screwed and which is connected at one end thereof in a gas tight manner by bellows means to one end of the hollow substantially tubular main valve body. The thus connected bellows means permits free movement of the main valve body while forming at the same time a passage for the throttled gas stream within the valve housing. This arrangement simplifies also the construction of the valve in that only a single branch passage from the inlet chamber of the valve housing is necessary in which the throttling member is coaxially arranged with the main valve body.

A snap spring and the auxiliary valve are arranged in the hollow main valve and according to the present invention the auxiliary valve is accessible through a coaxial opening in the main valve and may for instance be adjusted or exchanged through an opening in the upper end thereof. The auxiliary valve has preferably adjustably stop means in the form of a nut cooperating with the snap spring and the nut is constructed in such a manner so that it may be axially adjusted with regard to the auxiliary valve by a tool extended through an opening in the snap spring.

According to a further feature of the present invention, elongated pusher means are arranged along the common axis acting on the snap spring and operatively connected to the expansion body of the thermostat to be moved thereby in axial direction, and this pusher member is guided at one end portion thereof for movement in axial direction by guide means fixed to the valve housing, which may for instance include a pin arranged along the common axis and slidingly engaging in an elongated coaxial bore of the pusher means. This pin will not only provide for an exact guiding of the pusher means for movement along the common axis, but the arrangement is also made in such a manner that proper guiding of the main valve body along the common axis as well as a symmetrical action of the snap spring will be provided. For this purpose the pusher means preferably includes an enlarged end portion having an outer spherical surface which projects and slidingly engages an inner peripheral substantially cylindrical surface at the lower open end of the main valve body. An annular pressure member, having a spherical or conical seat engaging an upper portion of the spherical surface of the enlarged portion of the pusher means, acts on the snap spring located within the main valve body. The spherical surface of the pusher means prevents thereby a lateral deviation of the main valve from the common axis, whereas the pressure plate mounted on the spherical surface of the pusher means may adjust itself freely in all directions to assure thereby a uniform engagement with the snap spring.

In the valve arrangement according to the present invention the guide pin and the bellows means between the rigid portion of the passage means in the valve housing and the main valve body provide for a perfect guiding of the main valve body and the elements cooperating therewith without requiring any additional lateral guide means in the valve housing, whereby the construction and manufacturing of the valve housing is greatly simplified.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is an overall, partly sectioned, side view of the valve arrangement according to the present invention;

FIG. 2 is a vertical section drawn to an enlarged scale through the valve members shown in FIG. 1 and operating means therefor;

FIG. 3 is a top view of FIG. 2; and

FIG. 4 is a vertical section similar to FIG. 2 and showing a slightly modified arrangement.

Referring now to the drawings, and more specifically to FIG. 1 of the same, it will be seen that the thermostatically controlled valve according to the present invention includes a housing 1 which may for instance be formed of two parts connected by screws extending through abutting flanges of the two parts. The expansion body 2 of the thermostat is arranged within the housing 1 and the thermostat may be adjusted by means of an adjusting button 3 projecting beyond the upper wall 4 of the housing 1. The capillary tube 5 of the thermostat is preferably wound about a trunnion 6 fixed to a wall portion of the housing 1 before it leaves the latter in order to relieve the capillary tube from any tension forces. Movement of the expansion body 2 of the thermostat is transmitted either in direction or against the direction of a force provided by return spring 7 through a rod 8, slidably guided in an opening through a transverse wall 1a of the housing, onto a lever 10, which is turnably mounted at one end thereof on a pin 9 fixed to the housing, and which engages with a forked free end 42 thereof a projection 41 of elongated pusher means 11, the function of which will be described in further detail later on.

The wall 1a which extends transversely through the housing 1 divides the interior of the latter in an upper chamber 17 and a lower chamber 19. Gas inlet means 16 are provided which communicate with the upper chamber and gas outlet means 20 communicate with the lower chamber and are adapted to be connected to a conduit which feeds the gas entering the valve housing through the inlet means 16 to a burner of a heating arrangement, not shown. Preferably the gas entering the valve through the inlet means 16 in the direction of the arrow passes first through a thermo-electric safety valve of known construction which is likewise arranged in the chamber 17 and which may be controlled by means of the control button 1b projecting upwardly beyond the upper wall 4 of the housing.

Passage means 21 formed in a throttle housing 22 integral with the walls of the upper part of the housing 1 communicate with the chamber 17 and a throttling member 12 of known construction is screwed into the throttle housing 22 for adjusting flow of gas through the passage 21. The throttle member 12 extends with an upper portion thereof through an upper open end of the throttle housing 22 so as to be adjustable through a coaxial opening in the upper wall 4 of the housing 1 which is normally closed by a cover. A sealing ring 23 arranged about the upper portion of the throttling member 12 prevents escape of gas through the upper open end of the throttle housing 22. The passage 21 is continued, downstream of the lower end of the throttle member 12, by a passage 24 formed in the throttle housing 22 and arranged coaxially with the throttle member 12. Flexible bellows means are connected at one end thereof by means of a snap ring 27 to the lower end of the throttle housing 22 through which the passage 24 is formed and the bellows means 25 are connected at the lower end thereof by means of a snap ring 28 to the upper end of the hollow substantially tubular main valve body 13, in the interior of which the auxiliary valve member 14 is arranged. A throttled stream of gas may therefore pass from the chamber 17 with which the gas inlet means 16 communicates through the passage 21, passed the throttling member 12 into the passage 24, and through the bellows means 25 through the interior of the main valve body 13, passed the auxiliary valve member 14, through the opening formed in the transverse wall 1a of the valve housing 1, into the chamber 19 thereof and through the gas outlet means 20 to a gas burner connected to the gas outlet means.

According to the present invention, the throttling member 12, the portion of the throttling housing 22 in which the throttling member 12 is arranged, the bellows means 25, the main valve body 13 and the auxiliary valve member 14 arranged therein as well as the pusher means 11 are arranged along a common axis 15. A return spring 26 in form of a coil compression spring is coaxially arranged about the bellows means 25, the lower end of the return spring 26 engages the main valve body 13 and the spring is biased so as to resiliently press the main valve body against a valve seat 18 formed around the opening formed in the wall 1a.

FIG. 2 illustrates the main valve body 13 and the members cooperating therewith at an enlarged scale. The valve body 13 comprises an upper part 13a and a lower part 13b. The two parts 13a and 13b are coaxially arranged with each other and the lower part 13b has an upper tubular portion having an inner peripheral surface engaging the outer peripheral surface of a lower portion of the upper part 13a. The bottom face of the upper part engages with an annular portion thereof a shoulder face provided on the lower part 13b and the tubular portion of the part 13b has at its upper end an inwardly bent rim engaging a shoulder face of the upper part 13a so that the two parts are fixedly connected to each other. A sealing ring 29 between the peripheral surfaces of the two parts provides a fluid-tight seal. An auxiliary valve seat 30 is formed in the upper part 13a of the main valve body and the auxiliary valve member 14 cooperates with the valve seat 30 for opening and closing the passage formed through the valve seat 30. The valve member 14 is provided at its upper end thereof with a slot 31 for engagement with a tool, for instance a screwdriver whereas a valve stem 32 provided with an outer screw thread projects downwardly from the valve member 14 integrally connected thereto. A plurality of inwardly extended tongues 33a of a snap spring 33 are connected at the inner ends thereof to an unthreaded lower portion of the valve stem 32, whereas, the outer peripheral portion of the snap spring 33 engages the bottom face of the upper part 13a of the main valve body. Adjustable stop means 34 are threadingly connected to the threaded portion of the valve stem 32 against which the tongue 33a abut during upward movement thereof.

The stop means 34 are preferably in the form of a nut provided with non-illustrated projections or slots which may be engaged by a tool extended between the tongues 33a of the snap spring 33 so that the nut 34 may be turned together with the snap spring 33. During such turning of the nut 34 the auxiliary valve member 14 may be held stationary by means of a screwdriver engaged in the slot 31.

The lower part 13b of the main valve body 13 is provided at the lower end thereof with an annular sealing plate 35 which cooperates with the valve seat 18. The part 13b is provided at its lower open end with a coaxial inner peripheral cylindrical surface 36 which is slidably engaged by the outer spherical surface of an enlarged hollow upper portion 38 of the pusher member 11. The hollow portion 38 of the pusher member 11 is open at the upper end thereof and provided at the lower end thereof with a plurality of gas passages 37. An annular pressure plate 39 located within the lower part 13b of the main valve body 13 engages with an outer upwardly extending rim the bottom face of the snap spring 33 and the annular pressure plate 39 is mounted by means of a spherical seat 40 on the outer spherical surface of the enlarged portion 38 of the pusher member so as to be universally adjustable with respect thereto. The pusher member 11 is provided with a shoulder 41 which serves as abutment for the forked free end 42 of the lever 11 and the pusher member 11 is further provided with a central bore 48 therethrough in which the upper portion of a pin 49 is slidably engaged, which at the lower end is pressed fitted in blind bore 50 formed in the bottom wall of the housing 1. The pin 49 is arranged along the common axis 15 and serves for an exact guiding of the pusher member 14 along this common axis and thereby also for a proper guiding of the main valve body 13 along this common axis. The auxiliary valve member 14 is movable against the force of a return spring 43 which engages with its lower end the auxiliary valve member 14 and with its upper end a ring 45 abutting against inwardly extending projections on the upper end of the valve part 13a and having a central opening 44. As can be seen from FIG. 3 the ring member 45 is provided with cutouts 46 which cooperate with the projections 47 on the part 13a to form a bayonet joint so that the ring member 45 may be easily disconnected from the part 13a of the main valve body, whereby the auxiliary valve member 14 becomes easily accessible and exchangeable.

The above described arrangement will operate as follows:

During contraction of the body 2 of the thermostat, the lever 10 will be turned in clockwise direction and thereby the pusher member 11 will be moved upwardly. The ball shaped upper end of the pusher member will thereby slide upwardly in the cylindrical opening 36 of the main valve body. The pressure plate 39 freely adjustably mounted on the upper end of the ball shaped portion 38 of the pusher member engages thereby uniformly the snap spring 33 and presses the latter upwardly so that the snap spring will snap in its upper position. During the snap over the tongues 33 will engage the bottom end of the nut 34 on the stem of the auxiliary valve member 14 and the latter will be lifted from its valve seat 30 so that a limited stream of gas may flow through the passage 21, passed the throttle member 13 into the passage 24, and from there through the interior of the hollow bellows means 25, through the interior of the hollow main valve body 13, passed the valve seat 30 formed therein, through the opening in the wall 1a into the chamber 19 and from there through the outlet opening 20 to the gas burner. During further contraction of the thermostat body 2 the pusher means 11 is moved further in upward direction whereby the auxiliary valve member 14 remains in its fully open position and the main valve body 13 is lifted from its valve seat 18 to provide, according to the position the body 2 of the thermostat assumes at any instant, an opening for the main gas stream according to the desired heat requirement. The main valve body provides therefore for an infinite variable regulation of the main gas stream.

FIG. 4 illustrates an arrangement differing slightly from that shown in FIG. 2. In the embodiment shown in FIG. 4, the upper end of the pusher member 11' is substantially cylindrical and provided with a central conical cavity 51. The pressure plate 39' has a downwardly extending central conical projection 52 having a cone angle slightly smaller than that of the cavity 51 and abutting against the upper end of the pusher member in which the cavity is formed. The cylindrical upper end of the pusher member 11 is slidably guided in a central, coaxial, cylindrical opening 36' of the main valve body 13'. In this embodiment the main valve body 13' will make a tilting movement during opening and closing of the main valve to assure also during a small lifting thereof an appropriate open cross section for the gas flow. For this purpose the lower end of the projection 52 is arranged substantially at the same elevation as the upper surface of the valve seat 18 and below the center of gravity of the main valve body 13, whereas a return spring, similar to the return spring 26 shown in FIG. 1, engages the main valve body 13' above the center of gravity thereof.

The valve body 13' comprises likewise two members as described in connection with FIG. 2 which are connected to each other in the same manner. Due to the construction of the main valve member 13 or 13' from two parts connected to each other as described, it is possible to mount in a relatively small main valve body a relatively large snap spring 33. The above described arrangement according to the present invention has the additional advantages that the arrangement is very compact, that the various parts thereof may be machined in convenient manner to exact dimensions and that the various parts may be easily assembled and exactly fitted during assembly. Since the pusher member 11 is inserted with the upper part thereof in the main valve body 13 or 13' only during final assembly, the auxiliary valve member 14 located within the hollow main valve body 13 or 13' will be accessible from both sides thereof until the final assembly so that the auxiliary valve body and the stop means 34 on the stem thereof may be easily adjusted.

It will be understood that each of the elements described above, or two or more together, may also find a useful application on other types of thermostatically controlled valves differing from the types described above.

While the invention has been illustrated and described as embodied in a thermostatically controlled valve having a throttling member, a main valve body and an auxiliary valve body arranged along a common axis, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A thermostatically controlled valve comprising, in combination, a housing; wall means extending through said housing and dividing the latter in a pair of chambers, said wall means being formed with an opening therethrough providing communication between said chambers and defining a valve seat; gas inlet means communicating with one of said chambers; gas outlet means communicating with said other of said chambers; passage means in said housing communicating with said one chamber and having a portion coaxial with said valve seat; throttling means in said portion of said passage means; a main valve body movable in axial direction toward and away from said valve seat for controlling flow through said opening; an auxiliary valve in said passage means downstream of said throttling means for controlling flow of gas through said throttle passage means; connecting means connecting said auxiliary valve with said main valve body in such a manner that the position of said main valve body is controlled by the position of said auxiliary valve, said throttling means, said main valve body, and said auxiliary valve being arranged along a common axis and thermostat means including an expansion body arranged in said housing laterally of said common axis and operatively connected to said auxiliary valve for moving the latter between an open and a closed position.

2. A valve as set forth in claim 1, wherein said passage means comprises a rigid portion housing said throttling means and bellows means connected at one end to said rigid portion and at the other end thereof to one end of said main valve body.

3. A valve as set forth in claim 2, wherein said main valve body is hollow, open at both ends, and forms intermediate its ends an auxiliary valve seat coaxial with said main valve seat, said auxiliary valve cooperating with said auxiliary valve seat and being arranged within said main valve body to be adjustable and exchangeable through said one open end of the latter, and said connecting means including a snap spring connected to said auxiliary valve and engaging said main valve body.

4. A valve as set forth in claim 3, and including ring member removably connected to said one end of said main valve body, and spring means in said main valve body engaging with one end thereof said ring member and with the other end thereof said auxiliary valve and being biased to resiliently press the latter against said auxiliary valve seat.

5. A valve as set forth in claim 3, wherein said one end of said main valve body and said ring member are respectively formed with projections and cutouts to form a bayonet joint.

6. A valve as set forth in claim 3, wherein said auxiliary valve has a valve stem to which said snap spring is connected, and including stop means mounted on said valve stem adjustable in longitudinal direction of the latter, said stop means engaging said snap spring when the latter snaps over from one to another position thereof and said stop means limits the snap over position of said snap spring and thereby the position of said auxiliary valve connected thereto.

7. A valve as set forth in claim 6, wherein said valve stem has a threaded portion and wherein said stop means is in the form of a nut threadingly connected to said threaded portion, said snap spring being formed with an opening permitting insertion of a tool to engage said nut for adjusting the position thereof on said stem.

8. A valve as set forth in claim 3, and including elongated axially movable pusher means arranged along said common axis, said pusher means being connected to said thermostat means to be moved thereby in axial direction and engaging with one end thereof said snap spring; and guide means fixed to said housing for guiding said pusher means for axial movement.

9. A valve as set forth in claim 8, wherein said pusher means has a tubular portion and said guide means including a pin fixed at one end thereof to said housing and projecting with a slide fit into said tubular portion.

10. A valve as set forth in claim 9, wherein said pusher means includes an elongated member having at the end thereof facing said auxiliary valve as enlarged portion having a spherically outer surface slidingly engaging the other open end of said main valve body, and an annular pressure plate engaging said snap spring and being mounted freely adjustable on said spherical surface.

11. A valve as set forth in claim 9, wherein said pusher means includes an elongated member having at the end thereof facing said auxiliary valve a central conical cavity, and a pressure plate having a central conical projection projecting to one side of said plate into said cavity and having a cone angle smaller than that of said cavity, said pressure plate engaging at the other side thereof said snap spring.

12. A valve as set forth in claim 11, wherein the point of the conical projection is located below the center of gravity of said main valve body and substantially at the same elevation as said main valve seat; and including spring means engaging said main valve body above the center of gravity thereof and being biased to resiliently press said main valve body against said main valve seat.

13. A valve as set forth in claim 3, wherein said hollow main valve body is formed from two coaxial parts, one of said parts having a tubular portion having an inner peripheral surface engaging the outer peripheral surface of a portion of the other part, said tubular portion of said one part having at one end thereof an inwardly extending rim engaging a shoulder face of the other part and said two parts having spaced from said rim transverse faces abutting against each other; and a sealing ring between said peripheral surface of said two parts.

14. A valve as set forth in claim 1, wherein said thermostat means has an expansion body arranged in said housing along an axis substantially parallel to said common axis, wherein said passage means has a rigid portion extending along said common axis, wherein said throttling means is threadingly adjustable in said rigid portion of said passage means and including means projecting in axial direction of said expansion body beyond one wall of said housing for adjusting said expansion body, said one wall being formed with an opening arranged along said common axis through which said throttling means may be adjusted.

References Cited
UNITED STATES PATENTS

| | | | |
|---|---|---|---|
| 2,777,639 | 1/1957 | Grayson | 236—48 |
| 2,889,990 | 6/1959 | Loveland | 236—48 |
| 2,991,012 | 7/1961 | Wright | 236—48 |
| 3,163,359 | 12/1964 | Ages | 236—48 |

WILLIAM J. WYE, *Primary Examiner.*